US008520015B2

(12) United States Patent
Krishna et al.

(10) Patent No.: US 8,520,015 B2
(45) Date of Patent: Aug. 27, 2013

(54) METHOD FOR INTERMIXING GRAPHICS APPLICATIONS USING DISPLAY INTERMIX SERVER FOR COCKPIT DISPLAYS

(75) Inventors: Kiran Gopala Krishna, Karnataka (IN); Satyanarayan Kar, Karnataka (IN); Vamsi Agasthyaraju, Karnataka (IN); Shashidhara Ganganna, Karnataka (IN); Bincicil Mathew, Karnataka (IN); William Ray Hancock, Phoenix, AZ (US); Dan Lopez, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 805 days.

(21) Appl. No.: 12/172,815

(22) Filed: Jul. 14, 2008

(65) Prior Publication Data

US 2010/0039436 A1  Feb. 18, 2010

(51) Int. Cl.
G06T 1/00 (2006.01)
G06T 15/00 (2011.01)
G05B 11/01 (2006.01)

(52) U.S. Cl.
USPC .............................. 345/522; 345/619; 700/17

(58) Field of Classification Search
USPC ........................................................ 345/522
See application file for complete search history.

(56) References Cited

U.S. PATENT DOCUMENTS

| 5,097,411 | A * | 3/1992 | Doyle et al. .................. 345/522 |
| 6,980,216 | B2 | 12/2005 | Hancock et al. |
| 2002/0149599 | A1 | 10/2002 | Dwyer et al. |
| 2007/0005757 | A1 * | 1/2007 | Finger et al. .................. 709/224 |
| 2007/0132779 | A1 * | 6/2007 | Gilbert et al. ................. 345/619 |

FOREIGN PATENT DOCUMENTS

WO  2006103541 A1  10/2006

OTHER PUBLICATIONS

Black, Using Proven Aircraft Avionics Principles to Support a Responsive Space Infrastructure, Honeywell Space Applications, 4th Responsive Space Conference, Apr. 27, 2006, pp. 1-17.*
Lenovo., "Windows Focus Policy Manager," IP.COM Journal, Published on Jun. 28, 2006. IP.com No. IPCOM000137821D, IP.COM Inc., West Henrietta, NY, US.
European Search Report dated May 7, 2010, for Application No. 09164357.
EP Communication, EP 09164357.7-1243 dated Jul. 21, 2011.
Prisaznuk, P.J.; AEEC, ARINC Aeronautical Radio, Inc., May 21, 2007, pp. 1-394.

* cited by examiner

*Primary Examiner* — David T Welch
*Assistant Examiner* — Matthew D Salvucci
(74) *Attorney, Agent, or Firm* — Ingrassia Fisher & Lorenz, P.C.

(57) ABSTRACT

Methods and apparatus are provided for intermixing graphics layers and graphics applications using a display intermix server. A method is provided for intermixing a first graphics application having a first graphics layer and a second graphics application having a second graphics layer. The method comprises streaming a first graphics command from the first graphics application to a first memory location, where the first graphics command corresponds to the first graphics layer. The method also comprises streaming a second graphics command from the second graphics application to a second memory location, where the second graphics command corresponds to the second graphics layer. The method further comprises ordering the first graphics command and the second graphics command based on a priority scheme for the first graphics layer and the second graphics layer. The method further comprises providing ordered graphics commands to a rendering interface.

20 Claims, 8 Drawing Sheets

| PARAMETER NAME | PARAMETER DESCRIPTION |
|---|---|
| WIDGETTYPE | A661_INTERMIX_APP |
| WIDGETIDENT | UNIQUE IDENTIFIER OF THE WIDGET. |
| PARENTIDENT | IDENTIFIER OF THE IMMEDIATE CONTAINER OF THE WIDGET. |
| VISIBLE | VISIBILITY OF THE INTERMIX CLIENT APPLICATION GRAPHICS CONTENT |
| ENABLE | ABILITY OF THE INTERMIX CLIENT APPLICATION GRAPHICS CONTENT TO BE ACTIVATED FOR INTERACTIVITY |
| STYLESET | REFERENCE TO PREDEFINED GRAPHICAL CHARACTERISTICS INSIDE DISPLAY INTERMIX SERVER |
| POSX | THE X POSITION OF WIDGET REFERENCE POINT |
| POSY | THE Y POSITION OF WIDGET REFERENCE POINT |
| SIZEX | THE X DIMENSION SIZE (WIDTH) OF THE WIDGET |
| SIZEY | THE Y DIMENSION SIZE (HEIGHT) OF THE WIDGET |
| *SPECIFIC PARAMETERS* | *SPECIFIC PARAMETERS* |
| INTERMIXAPPPROCESSID | REFERENCE ID OF THE INTERMIX CLIENT APPLICATION PROCESS AVAILABLE TO DISPLAY INTERMIX SERVER |
| EVENTCONTEXTNUMBER | CONTEXT NUMBER OF EVENT SET BY EVENT ORIGINATOR |
| INTERMIXAPPSHAREDCONTENTTYPE | 0 - NONE; 1 - SHARED DISPLAY LIST; 2 - SHARED TEXTURE |
| INTERMIXAPPSHAREDCONTENTREADY | PARAMETER NOTIFYING THE AVAILABILITY OF INTERMIXAPPSHAREDCONTENT: READY / NOT READY |
| INTERMIXAPPSHAREDCONTENT | NAME OF APPLICATION SHARED GRAPHICS COMMAND BUFFER |
| MASKACTIVE | TRUE / FALSE |
| MASKTYPE | INCLUSIVE / EXCLUSIVE |
| MASKPOSX | POSX OF THE CURSOR MASK REGION |
| MASKPOSY | POSY OF THE CURSOR MASK REGION |
| MASKSIZEX | SIZEX OF THE CURSOR MASK REGION |
| MASKSIZEY | SIZEY OF THE CURSOR MASK REGION |
| HIT | SHARED APPLICATION NOTIFYING DISPLAY INTERMIX SERVER IF ITS THE CONSUMER OF THE EVENT TRIGGERED BY INTERACTIVITY |

FIG. 9

METHOD FOR INTERMIXING GRAPHICS APPLICATIONS USING DISPLAY INTERMIX SERVER FOR COCKPIT DISPLAYS

TECHNICAL FIELD

The subject matter described herein relates generally to cockpit displays in aircraft, and more particularly, embodiments of the subject matter relate to systems and methods for intermixing graphics layers for graphics applications associated with avionics or aircraft subsystems.

BACKGROUND

Aircraft cockpit displays include numerous cockpit instruments and controls that compete for cockpit space and pilot attention. Electronic instrument displays are used in place of traditional mechanical gauges and utilize computer displays to display flight related information as needed. These electronic cockpit displays often use software for integrating the computer displays with external (or peripheral) systems, such as avionics or other aircraft sensors and systems. Often, these peripheral systems have associated software (e.g., graphics applications) for managing the graphics functionality and interfacing with the electronic cockpit display software.

During the life of these peripheral systems (e.g., avionics or aircraft subsystems), upgrading existing graphics applications often requires making changes to the peripheral systems. For example, as technology evolves, it may be desirable to upgrade or add new graphical features (adding new display function or changing the layout, appearance or behavior of display objects) to the existing graphics applications. However, changing the peripheral system is cost-prohibitive, because many peripheral systems must comply with legally mandated standards for safety and reliability. This increases the complexity of interfacing and integration, along with added development time and cost. Thus, although it may be possible to improve cockpit displays and enhance the user experience (e.g., allowing pilots or crew members to customize the look and feel, accommodating personal preferences or needs, or introducing interactivity), current systems often make upgrading the graphics impractical or infeasible.

Some airlines or equipment manufacturers have invested large amounts of development time and cost to create cockpit display solutions using proprietary architectures, which may require a unique graphics application architecture. These approaches may result in minimal reuse of already proven features and applications that are already in service and certified under applicable standards. Thus, current solutions require additional investment and, in some cases, even result in the need to develop entirely new systems.

BRIEF SUMMARY

A method is provided for intermixing a first graphics application having a first graphics layer and a second graphics application having a second graphics layer. The method comprises streaming a first graphics command from the first graphics application to a first memory location, where the first graphics command corresponds to the first graphics layer. The method also comprises streaming a second graphics command from the second graphics application to a second memory location, where the second graphics command corresponds to the second graphics layer. The method further comprises ordering the first graphics command and the second graphics command based on a priority scheme for the first graphics layer and the second graphics layer. The method may also comprise providing the ordered graphics commands to a rendering interface.

An apparatus is provided for a display system. The display system comprises a command buffer corresponding to a graphics layer and being configured to receive and store a first graphics command. A graphics programming interface is configured to provide the first graphics command to the command buffer and obtain the first graphics command from the command buffer. A display intermix server is configured to obtain the first graphics command from the graphics programming interface and order the first graphics command among a plurality of graphics commands corresponding to a plurality of graphics layers based on a priority scheme. Ordering the first graphics command and the plurality of graphics commands results in ordered graphics commands, and the display intermix server is configured to provide the ordered graphics commands to a rendering interface.

BRIEF DESCRIPTION OF THE DRAWINGS

Embodiments of the subject matter will hereinafter be described in conjunction with the following drawing figures, wherein like numerals denote like elements.

DETAILED DESCRIPTION

The following detailed description is merely exemplary in nature and is not intended to limit the subject matter of the application and uses thereof. Furthermore, there is no intention to be bound by any theory presented in the preceding background or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter.

For the sake of brevity, conventional techniques related to processing, data transmission, rendering, computer program interfacing, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to electronic display systems used in aircraft cockpits to provide information and data relating to the various aircraft systems or avionics to aircraft pilots and/or crew. A display intermix server may be used to integrate graphics applications, provide interactivity, and minimize costs of acquiring new aircraft systems, upgrading existing aircraft systems, or adding new display functions. It should be appreciated that although the subject matter may be described herein in the context of an aviation environment for purpose of explanation, the subject matter is not limited to aviation systems and aircraft. The subject matter described herein also applies to other embedded systems such as spacecraft, ships and marine systems, automotive systems and other ground vehicles, remote control stations, industrial control systems, and the like.

Operative Environment

Figure 1:
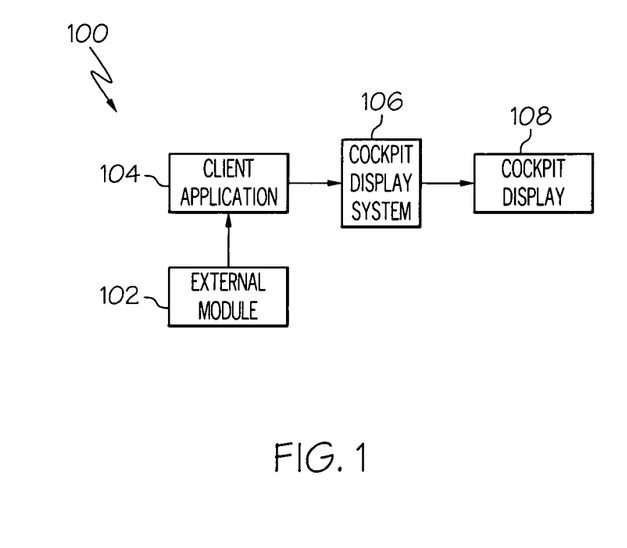
FIG. 1 is a block diagram of an aircraft display system in accordance with one embodiment.

As shown in FIG. 1, an aircraft display system 100 may include, without limitation, an external module 102, a client application 104, a cockpit display system 106, and a display device 108. The aircraft display system 100 may be used to provide information or data from various external modules 102 to aircraft pilots and/or crew via the display device 108 during operation of an aircraft. These and possibly other components may be coupled as needed to support the operation of the aircraft display system 100 as described in greater detail below.

Referring again to FIG. 1, in an exemplary embodiment, the external module 102 is coupled to a client application 104 (or user application), which is in turn coupled to the cockpit display system 106. In an exemplary embodiment, the cockpit display system 106 is coupled to the display device 108, and may be configured to perform various tasks and functions as described in greater detail below.

In accordance with one embodiment, the external module 102 may comprise avionics, an aircraft subsystem, a line-replaceable unit (LRU), external control logic, or another comparable module. In an exemplary embodiment, the external module 102 provides data from or information regarding one or more aircraft subsystems (such as control, monitoring, communication, navigation, weather, and/or anti-collision systems) as is known in the art. The external module 102 may be implemented as hardware, software, or a combination thereof which may be embedded on one or more circuit boards and/or circuit card assemblies. Although the depicted aircraft display system 100 includes one external module 102, in practice, numerous external modules 102 may be present. In an exemplary embodiment, the external module 102 provides functional data pertaining to aircraft subsystems to a corresponding client application 104 which generates a graphical display in response to the functional data, as described in greater detail below.

In an exemplary embodiment, the client application 104 functions as an interfacing mechanism between the cockpit display system 106 and the external module 102. The client application 104 may be implemented as hardware, software, or a combination thereof which may be embedded on one or more circuit boards and/or circuit card assemblies. The client application 104 may be located alone in hardware (e.g., circuit board or circuit card), or share hardware with the external module 102 or the cockpit display system 106. In practice, numerous client applications 104 may be present, and each may have a corresponding external module 102. In an exemplary embodiment, the client application 104 processes the functional data provided by the external module 102 and provides various graphics commands and/or control parameters to the cockpit display system 106. The cockpit display system 106 processes the commands and/or parameters from the client application 104 for rendering on a display device 108. The cockpit display system 106 may further provide processing capabilities for subdividing the display on the display device 108 into smaller display areas or windows. Although only one display device 108 is shown in FIG. 1, in practical embodiments, one or more display devices 108 may be present.

Figure 2:
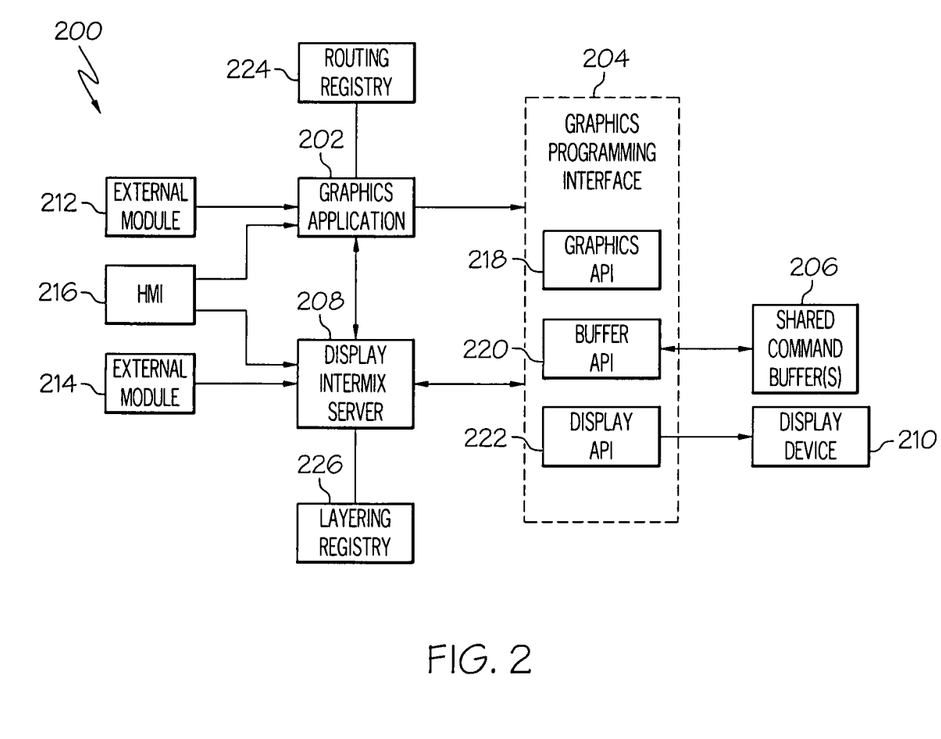
FIG. 2 is a block diagram of a cockpit display framework in accordance with one embodiment.

Referring now to FIG. 2, in an exemplary embodiment, a cockpit display framework 200 includes, without limitation, a graphics application 202, a graphics programming interface 204 (GPI), a shared command buffer 206, a display intermix server 208, and a display device 210. The cockpit display framework 200 may be configured to receive control commands (e.g., functional data and/or inputs) from external modules 212, 214 and/or a human machine interface 216 (HMI). In an exemplary embodiment, the GPI 204 comprises numerous application program interfaces (APIs) and includes, without limitation, a graphics API 218, a buffer API 220, and a display API 222. Some of the elements of FIG. 2 are identical to their counterparts described above in reference to FIG. 1, and the description will not be redundantly repeated in the context of FIG. 2.

In an exemplary embodiment, the HMI 216 is configured to receive interactive events from a user (e.g., pilot, copilot, crew). In various embodiments, the HMI 216 may be a touch screen, a cursor, a mouse, a keyboard, a knob, a control panel, a mechanical instrument, or another comparable means for interfacing with a user. The HMI 216 is configured to broadcast and/or provide information or control commands to the graphics application 202 and the display intermix server 208 in response to interactive events, as discussed in greater detail below.

In an exemplary embodiment, the graphics application 202 is coupled to and/or configured to receive control commands from an external control module 212 and/or the human machine interface 216. The graphics application 202 is further coupled to the GPI 204, which in turn is coupled to the shared command buffer 206 via the buffer API 220. The graphics application 202 is coupled to the display intermix server 208 (e.g., via a bus interface or shared memory) and communicates with the display intermix server 208 as described below. The display intermix server is also coupled to the GPI 204. The display intermix server 208 may be coupled to and/or configured to receive control commands from an external control module 214 and/or the human machine interface 216. The display API 222 may be coupled to the display device 210. In an exemplary embodiment, the display intermix server 208 is coupled to a layering registry 226 and the graphics application 202 is coupled to a routing registry 224, as described in greater detail below.

It should be understood that FIG. 2 depicts a simplified version of the cockpit display framework 200, and that in practice, multiple instances and various combinations of the respective elements may be present depending on the embodiment. For example, numerous instances of graphics applications 202 may be present and associated with an instance of the display intermix server 208. There may be more than one display device 210, and each display device 210 may be associated with a separate instance of display intermix server 208. In an exemplary embodiment, the display device 210 may be subdivided into one or more windows, each window having an instance of display intermix server 208 associated therewith.

Referring again to FIG. 2, in an exemplary embodiment, the graphics application 202 is configured to interface between a corresponding external control module 212 and the display intermix server 208, as described in greater detail below. In an exemplary embodiment, the graphics application 202 includes one or more graphics layers associated with the graphics application 202 (i.e., owned by the graphics application 202). A graphics layer is a logical grouping of graphical objects or widgets, which may or may not be interactive, as will be understood in the art. The graphics application 202 manages the graphics layers and widgets and the manner and order of rendering in response to control commands and other system parameters. In an exemplary embodiment, the graphics application 202 is coupled to a routing registry 224, for managing the rendering of the graphics layers associated with the graphics application 202, as described in greater detail below.

In an exemplary embodiment, the graphics programming interface 204 (GPI) is configured to interface between the graphics application 202, the shared command buffer 206, the display intermix server 208, and other computing devices or systems using one or more application program interfaces (APIs). In an exemplary embodiment, the graphics API 218 is configured to receive a high-level graphics command (e.g., from the graphics application 202) and convert the high-level graphics command to a graphics command comprising a display list, texture, primitive chain, or any other graphics structure that may be used for future rendering. The buffer API 220 is configured to transmit data between applications and/or memory locations (e.g., the shared command buffer 206), as will be appreciated in the art. The display API 222 is configured to receive graphics commands and provide functionality for rendering on a display device 210 and/or interfacing with a device driver for the display device 210.

Figure 3:
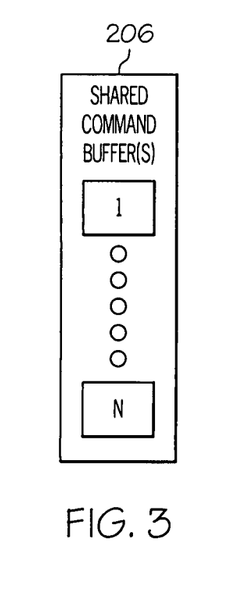
FIG. 3 is a block diagram of an exemplary embodiment of a shared command buffer suitable for use in the cockpit display framework of FIG. 2.

Referring now to FIG. 2 and FIG. 3, in an exemplary embodiment, the shared command buffer 206 includes a plurality of memory locations or buffers for maintaining and/or storing graphics commands from the graphics application 202 and/or display intermix server 208. In an exemplary embodiment, each graphics layer has a separate command buffer and/or memory location for the graphics commands corresponding to the respective graphics layer, as described below. Thus, in an exemplary embodiment, for n number of graphics layers, there are n different shared command buffer 206 locations. The routing registry 224 provides information for mapping graphics commands for a graphics layer from the graphics application 202 to the location in the shared command buffer 206 that corresponds to the graphics layer, as described below. In accordance with one embodiment, if it is not desirable or necessary to intermix the graphics application 202, the routing registry 224 may provide information to the graphics application 202 such that the graphics commands are streamed to the display device 210 via the GPI 204 without use of the shared command buffer 206. In an exemplary embodiment, each graphics application 202 has a routing registry 224 associated therewith, although in other embodiments, a plurality of graphics applications 202 may share one routing registry 224.

Figure 4:
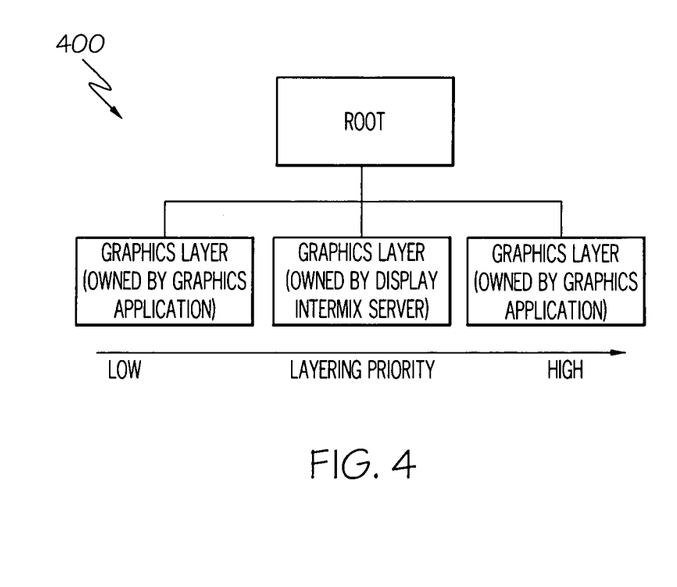
FIG. 4 is a block diagram of an exemplary embodiment of a hierarchical tree suitable for use in the cockpit display framework of FIG. 2.

Referring now to FIG. 2 and FIG. 4, in an exemplary embodiment, the display intermix server 208 manages the priority of rendering for the graphics applications 202 and graphics layers, as described in greater detail below. The display intermix server 208 may use one or more data structures to manage the priority of rendering the graphics commands based on a priority scheme defined in the layering registry 226, as described in greater detail below. For example, as shown in FIG. 4 and described below, the display intermix server 208 may implement a hierarchical tree 400, wherein each node corresponding to a graphics layer of a graphics application 202 comprises the contents of the shared command buffer 206 for the respective graphics layer, which are ordered according to the priority scheme in the layering registry 226. Depending on the embodiment, the display intermix server 208 may also function as a graphics application by interfacing with a corresponding external module 214. In such an embodiment, the display intermix server 208 may include information for one or more graphics layers associated with the display intermix server 208 and maintained as nodes in the hierarchical tree based on the priority scheme defined in the layering registry 226. The display intermix server 208 may also be compliant with standards, such as Aeronautical Radio, Incorporated (ARINC) standard number 661 (ARINC 661), for communicating and interfacing with graphics applications 202 and/or external modules 214. In an exemplary embodiment, the display intermix server 208 manages the priority and order of rendering across all graphics applications 202 and graphics layers in accordance with a priority scheme defined in the layering registry 226 coupled to the display intermix server 208, as described in greater detail below.

Depending on the embodiment, the display intermix server 208 and the graphics application 202 may exist in the same computing platform. In an exemplary embodiment, for real time applications, each shall maintain its own space and time partitions. For example, the graphics API 218 may be configured to implement space and time partitioning. The specific methods for generating time and space partitioned display lists, textures, and/or primitive chains will not be described herein. For example, U.S. Pat. No. 6,980,216 entitled "GRAPHICS DRIVER AND METHOD WITH TIME PARTITIONING," assigned to the assignee of the present application and incorporated by reference herein, discloses an exemplary method of generating time-partitioned primitive chains. The graphics applications 202 and display intermix server 208 may have time and space boundaries defined for compliance to regulatory requirements or any other safety requirements in safety critical systems like cockpit displays, as will be understood.

Intermixing Graphics Applications and Graphics Layers

Figure 5:
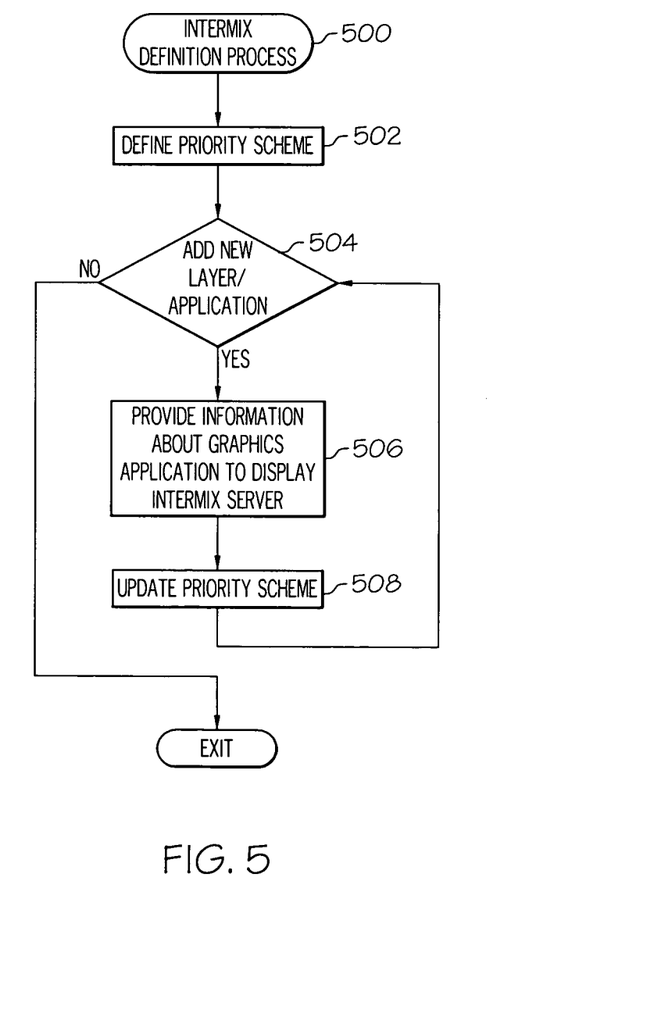
FIG. 5 is a flow diagram of an exemplary intermix definition process suitable for use with the cockpit display framework of FIG. 2 in one embodiment.

Referring now to FIG. 5, in an exemplary embodiment, a cockpit display framework 200 may be configured to perform an intermix definition process 500 and additional tasks, functions, and operations described below. The various tasks may be performed by software, hardware, firmware, or any combination thereof. For illustrative purposes, the following description may refer to elements mentioned above in connection with FIG. 1, FIG. 2, FIG. 3 and FIG. 4. In practice, the tasks, functions, and operations may be performed by different elements of the described system, such as the graphics application 202, the GPI 204, the display intermix server 208, the graphics API 218, the buffer API 220, or the display API 222. It should be appreciated that any number of additional or alternative tasks may be included, and may be incorporated into a more comprehensive procedure or process having additional functionality not described in detail herein. Further, the intermix definition process 500 is not limited to cockpit display framework 200, and may be adapted for other frameworks, as will be understood.

Referring again to FIG. 5, and with continued reference to FIG. 1, FIG. 2, FIG. 3 and FIG. 4, the intermix definition process 500 may be performed as a preliminary procedure, for example, during an initialization or pre-configuration routine for the system. Alternatively, process 500 might be initiated in response to a signal or command indicating that the aircraft or a given subsystem thereof has been turned on. In an exemplary embodiment, the intermix definition process 500 is configured to define a priority scheme for the order of rendering and the intermixing of graphics applications and/or graphics layers (task 502). In an exemplary embodiment, the display intermix server 208 manages the priority of graphics layers using the layering registry 226. The rules for layering and/or the priority scheme may be also predefined and/or provided during initialization (e.g., installation or creation) of the display intermix server 208. For example, the priority scheme may be obtained by interpreting a binary file (or byte codes or scripts generated by a user-friendly tool) provided to the display intermix server 208. The priority scheme may be statically determined and fixed for the duration or operation, or may change based on the run-time contexts triggered by some internal and/or external control logic (e.g., external modules 212, 214), for example, in the scenario of reversion or the like. In accordance with one embodiment, where a single layering registry 226 is shared across multiple instances of display intermix servers 208, the layering registry also maintains the association between graphics applications 202 and their respective display intermix server 208.

In an exemplary embodiment, the intermix definition process 500 is configured to enable adding new graphics features, layers, or applications. The intermix definition process 500 is configured to determine if a new graphics layer or a new graphics application is to be added (task 504). For example, it may be desirable to update graphics features of an existing graphics application by adding a new graphics layer to the graphics application, or adding a new graphics application altogether. Alternatively, new graphical features may be added by adding a new graphics layer associated with the display intermix server.

In an exemplary embodiment, the intermix definition process 500 is configured to provide information about the new graphics application 202 (or the graphics application 202 associated or owning the new graphics layer) to the display intermix server 208 (task 506). In accordance with one embodiment, the priority scheme or rules of layering (or intermixing) is coded as part of the graphics application(s) 202 and provided to the display intermix server 208 (e.g., via a bus interface). The rules for layering and/or the priority scheme may be also defined by the functional requirements of the graphics application which may be provided during initialization (e.g., installation or creation of the graphics application 202) or normal execution.

In an exemplary embodiment, if a new graphics layer or a new graphics application is to be added, the intermix definition process 500 is configured to update the priority scheme to include the new graphics layer(s) (task 508). In an exemplary embodiment, the intermix definition process 500 is configured to redefine the priority scheme for the order of rendering and the intermixing of graphics applications and graphics layers by updating the layering registry 226 with the information about the new graphics application 202 or graphics layer. The display intermix server 208 is configured to maintain the layering registry 226 such that it reflects the updated priority scheme for intermixing the new graphics layers and/or graphics applications with existing graphics layers and/or applications.

Figure 6:
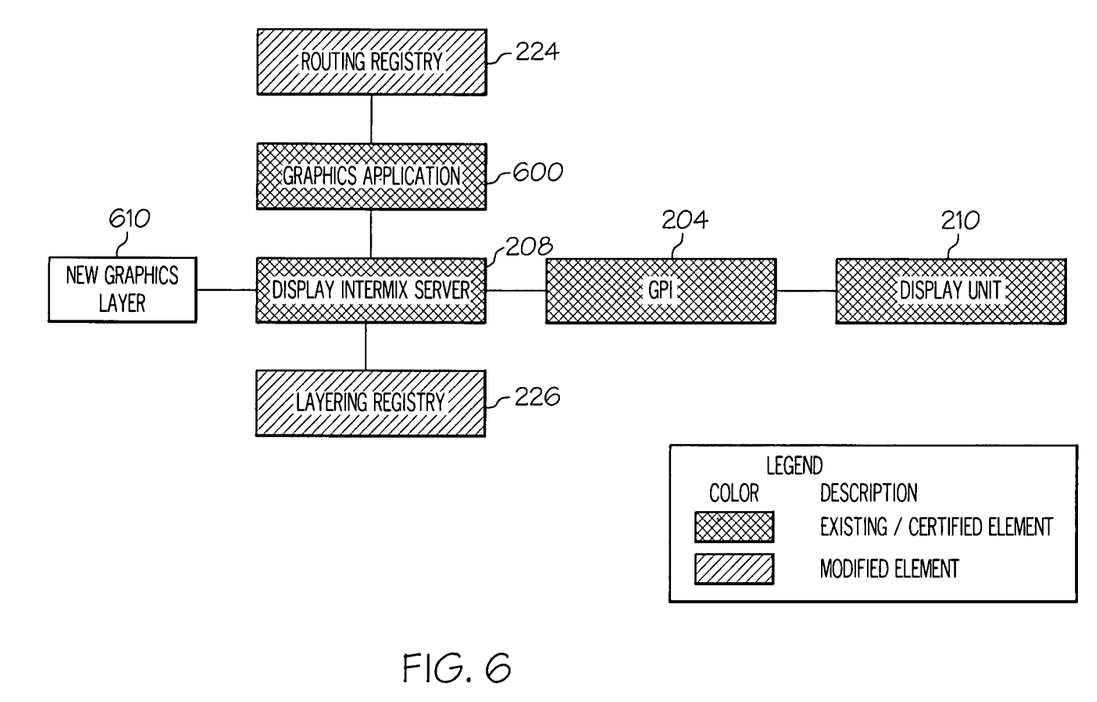
FIG. 6 is a block diagram of an exemplary cockpit display system illustrating intermix definition process of FIG. 5 in one embodiment.

Referring now to FIG. 5 and FIG. 6, it should be appreciated that new graphics applications or new graphics layers may be intermixed with little or no changes to existing applications. For example, as shown in FIG. 6, in order to add a new graphics layer 610 (or a new graphics application) to be intermixed with an existing certified graphics application 600, the intermix definition process 500 allows the new graphics layer 610 (or new graphics application) to be added by merely updating the routing registry 224 and layering registry 226 while the certified graphics application 600 remains unchanged. Thus, because the existing certified graphics application 600 is not modified, the increased development costs and potential need for recertification of existing applications can be avoided or minimized using the proposed scheme and framework. The loop defined by tasks 504, 506, and 508 may repeat as needed to enable intermixing as many graphics layers or graphics applications 202 as desired.

Figure 7:
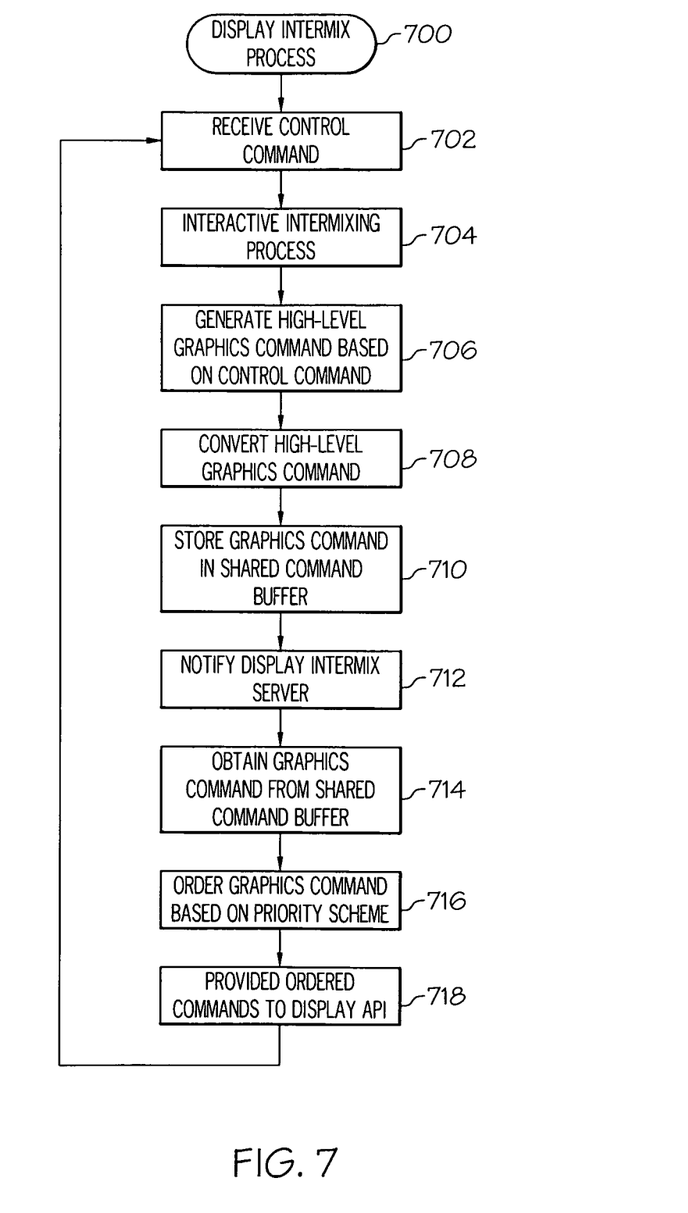
FIG. 7 is a flow diagram of an exemplary display intermix process suitable for use with the cockpit display framework of FIG. 2 in one embodiment.

Referring now to FIG. 7, in an exemplary embodiment, a cockpit display framework 200 may be configured to perform a display intermix process 700 and additional tasks, functions, and operations described below. The various tasks may be performed by software, hardware, firmware, or any combination thereof. For illustrative purposes, the following description may refer to elements mentioned above in connection with FIG. 1, FIG. 2, FIG. 3, FIG. 4 and FIG. 5. In practice, the tasks, functions, and operations may be performed by different elements of the described system, such as the graphics application 202, the GPI 204, the display intermix server 208, the graphics API 218, the buffer API 220, or the display API 222. It should be appreciated any number of additional or alternative tasks may be included, and may be incorporated into a more comprehensive procedure or process having additional functionality not described in detail herein.

Referring again to FIG. 7, and with continued reference to FIG. 1, FIG. 2, FIG. 3, FIG. 4 and FIG. 5, the display intermix process 700 may be initiated in response to a signal or command indicating that the aircraft or a given subsystem thereof has been turned on. In an exemplary embodiment, the display intermix process 700 is configured to receive a control command (task 702). In accordance with one or more embodiments, the control command is provided to a graphics application 202 and/or the display intermix server 208 by an external module 212, 214 or the HMI 216. Alternatively, the graphics application 202 or display intermix server 208 may include logic to generate the control command based on functional data provided by the external module 212, 214 or HMI 216.

In alternative embodiments, the display intermix process 700 may be configured to prompt an interactive intermixing process (task 704), as described in greater detail below with reference to FIG. 8. The interactive intermixing process may be performed in response to a control command and/or functional data provided by the HMI 216 in response to an interactive event. In the case of overlapping interactive graphics layers (or graphical objects), the interactive intermixing process arbitrates among a plurality of graphics applications 202 to identify the graphics application 202 that should respond to the interactive event, as discussed below.

In an exemplary embodiment, the display intermix process 700 is configured to generate a high-level graphics command based on the control command and/or functional data (task 706). For example, the graphics application 202 may generate a high-level graphics command for a graphics layer associated with the graphics application 202 based on the control command provided by the external module 212. In an exemplary embodiment, the display intermix process 700 is configured to convert the high-level graphics command to a lower-level graphics command (task 708). For example, the graphics API 218 may receive the high-level graphics command from a graphics application 202 and convert the high-level graphics command to a graphics command comprising display list, texture, and/or primitive chain that may be used for future rendering, as will be understood.

In an exemplary embodiment, the graphics command is stored in a memory location (e.g., shared command buffer 206) corresponding to the respective graphics layer (task 710). The graphics application 202 may be configured to stream the graphics command to a memory location (e.g., shared command buffer 206) associated with the corresponding graphics layer via the GPI 204. In an exemplary embodiment, the routing registry 224 contains information for mapping graphics commands for a respective graphics layer to the shared command buffer 206 (e.g., buffer memory location) that corresponds to the graphics layer. The graphics application 202 may be configured to obtain information regarding the proper command buffer 206 location from the routing registry 224, and provide the information to the GPI 204 along with the high-level graphics command. The buffer API 220 may route (e.g., store) the graphics command to the proper command buffer 206 using the information from the routing registry 224 provided to the GPI 204.

In an exemplary embodiment, the display intermix process 700 is configured to notify the display intermix server 208 of a change in the graphics application 202 in response to the control command (task 712). In an exemplary embodiment, the graphics application 202 provides a message and/or control parameters to the display intermix server 208 (e.g., via a bus interface or shared memory). For example, if the display intermix server 208 and the graphics application 202 are ARINC 661 compliant, the graphics application 202 transmits a graphical object including various parameters (such as the type and identity of the widget, position, visibility) according to the ARINC 661 specification. The graphics application 202 may also be configured to provide the display intermix server 208 with information identifying the proper command buffer 206 and the type of content (such as a display list or texture) stored in the shared command buffer 206. Other parameters may also be included or modified to enable interactivity, as discussed in greater detail below.

In an exemplary embodiment, the display intermix server 208 is configured to obtain the graphics command from the shared command buffer 206 (task 714). For example, the display intermix server 208 may receive the shared command buffer 206 location for a respective graphics layer from the graphics application 202, and provide the buffer location information to the buffer API 220 to obtain the graphics command. In some embodiments, where the display intermix server 208 has a graphics layer associated therewith, the display intermix server 208 may manage the graphics commands corresponding to the graphics layer owned by the display intermix server without use of the shared command buffer 206.

In an exemplary embodiment, the display intermix server 208 is configured to order the obtained graphics command among a plurality of graphics commands corresponding to the graphics applications 202 (and each individual graphics layer associated therewith) associated with the display intermix server 208 (task 716). The display intermix server 208 may use one or more data structures to manage the priority of rendering the graphics commands based on the priority scheme defined in the layering registry 226. For example, as discussed above in reference to FIG. 4, in an exemplary embodiment, the display intermix server 208 implements a hierarchical tree, wherein each node corresponding to a graphics application 202 comprises the contents of the shared command buffer 206 for the respective graphics layer, which are ordered according to the priority scheme in the layering registry 226. As shown, if the display intermix server 208 owns a graphics layer, the graphics layer may be interleaved between layers corresponding to graphics applications 202. In accordance with one embodiment, if the display intermix server 208 is ARINC 661 compliant, a graphical object may be instantiated for every ARINC 661 widget and arranged in the hierarchical tree as per the ARINC 661 definition file.

Referring again to FIG. 7, in an exemplary embodiment, the display intermix server 208 is configured to provide the ordered graphics commands for the graphics applications 202 (and layers associated therewith) to a rendering interface (e.g., the GPI 204 or display API 222) (task 718). In an exemplary embodiment, the display API 222 is configured to receive and/or process the graphics commands (which are in the form of display lists, primitive chains, textures, etc.) for rendering on the display device 210. In practice, the display API 222 may interface with a device driver (not shown) for rendering the graphics commands on the display device 210, which will be understood in the art and therefore not described in detail herein. The loop defined by tasks 702, 704, 706, 708, 710, 712, 714, 716, and 718 may repeat indefinitely during operation of an aircraft (or a given subsystem thereof) to provide intermixed graphics applications (or graphics layers) and enable interactivity as described below.

Intermixing Interactivity

Figure 8:
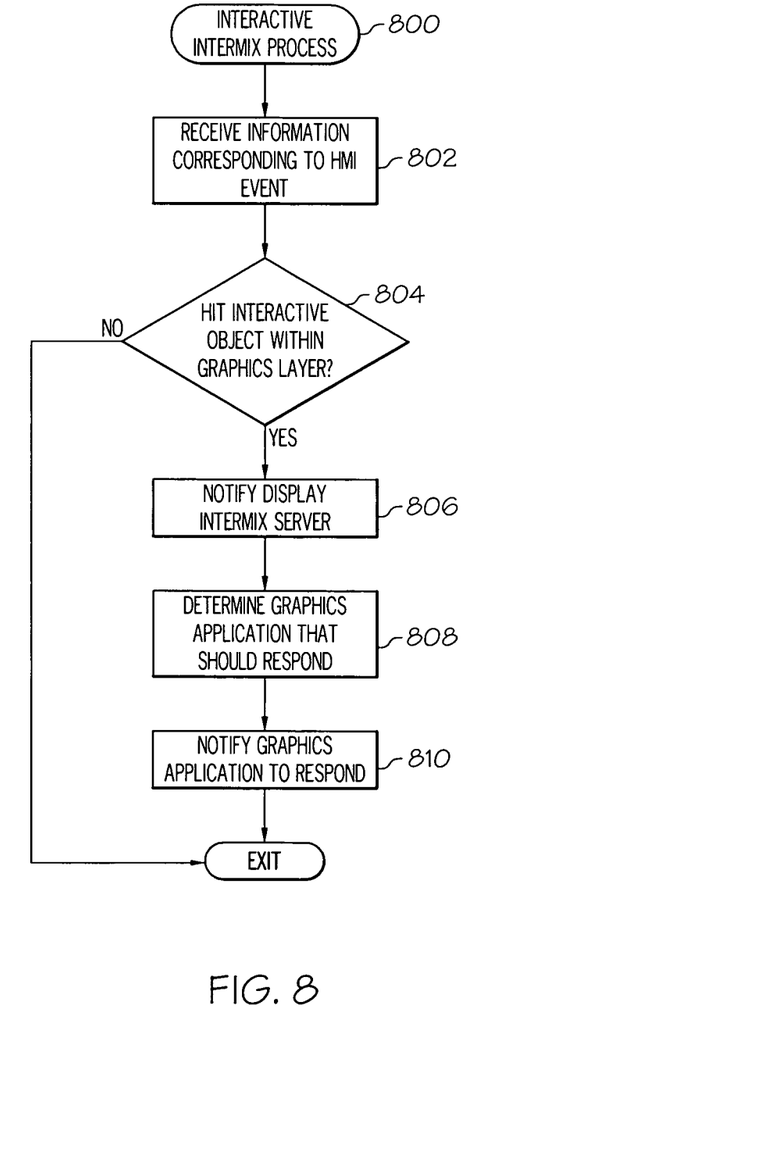
FIG. 8 is a flow diagram of an exemplary interactive intermix process suitable for use with the display intermix process of FIG. 7 in one embodiment.

Referring now to FIG. 8, in an exemplary embodiment, a cockpit display framework 200 may be configured to perform an interactive intermix process 800 and additional tasks, functions, and operations described below. The various tasks may be performed by software, hardware, firmware, or any combination thereof. For illustrative purposes, the following description may refer to elements mentioned above in connection with to FIG. 1, FIG. 2, FIG. 3, FIG. 4, FIG. 5 and FIG. 7. In practice, the tasks, functions, and operations may be performed by different elements of the described system, such as the graphics application 202, the GPI 204, the display intermix server 208, the graphics API 218, the buffer API 220, or the display API 222. It should be appreciated any number of additional or alternative tasks may be included, and may be incorporated into a more comprehensive procedure or process having additional functionality not described in detail herein.

Referring again to FIG. 8, and with continued reference to FIG. 1, FIG. 2, FIG. 3, FIG. 4, FIG. 5 and FIG. 7, in an exemplary embodiment, an interactive intermix process 800 is configured to begin in response to an interactive event and/or control command received from the HMI 216 (e.g., task 704 in FIG. 7). Depending on the HMI 216, the interactive event may be a mouse click, turning a knob on a control panel, a touch sensed by a touch screen, a keyboard entry, or another comparable user input. The HMI 216 is configured to broadcast or provide information regarding the event (such as the location or coordinates of event on a display screen, the type of event, the device generating the event, etc.), the instances of graphics application 202 and display intermix server 208 associated with the HMI 216.

In an exemplary embodiment, each instance of graphics application 202 and display intermix server 208 is coupled to the HMI 216 and configured to receive information corresponding to the HMI event (task 802). In an exemplary embodiment, the graphics application 202 and display intermix server 208 are configured to determine whether or not the HMI event corresponds to an interactive graphical object within a layer owned by the graphics application or the display intermix server 208, respectively (task 804). For example, the graphics application 202 may perform a Hit test, by comparing the information from the HMI event (such as location and/or coordinates) and determining if the HMI event overlaps or occurred in the same area as an interactive object (i.e., Hit the interactive object) within a graphics layer owned by the graphics application 202 (or display intermix server 208).

In an exemplary embodiment, if a graphics application 202 determines that the HMI event produced a Hit within a graphics layer owned by the graphics application 202, the graphics application 202 is configured to notify the display intermix server 208 that the HMI event produced a Hit (task 806). This may be done by sending a message or other data to the display intermix server 208 (e.g., via a bus interface or shared memory).

Figure 9:
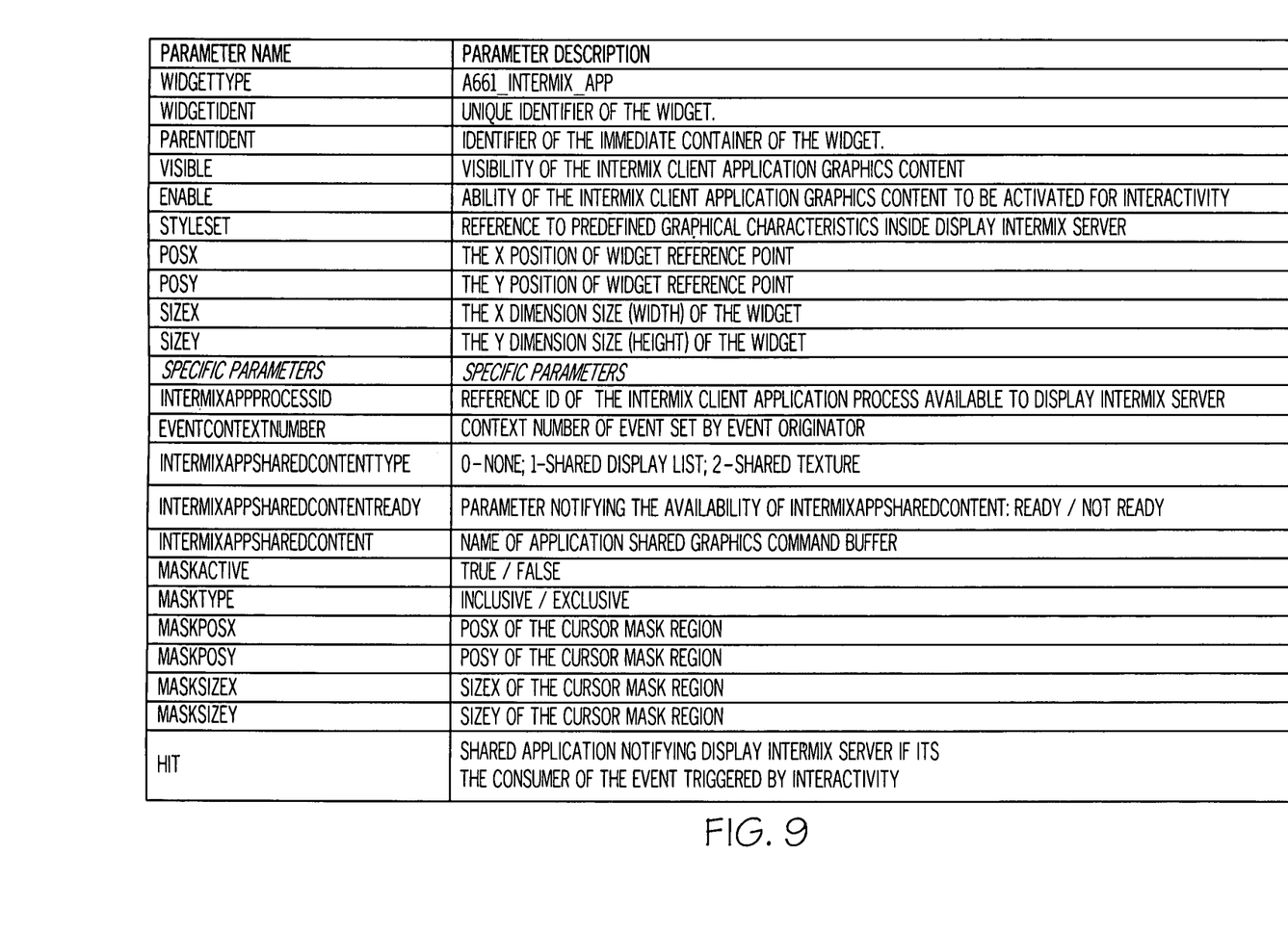
FIG. 9 is a table of an exemplary interactive widget suitable for use with the interactive intermix process of FIG. 8 in one embodiment.

Referring now to FIG. 8 and FIG. 9, in accordance with one embodiment, if the display intermix server 208 is ARINC 661 compliant, the graphics application 202 may be configured to notify the display intermix server 208 by using a custom parameter for a graphical object or widget provided to the display intermix server 208. For example, a custom widget may be created to include additional parameters to enable intermixing interactivity, such as those shown in FIG. 9. The custom widget need not be the only widget in a graphics layer, and there may be other widgets or many other instances of custom widgets in a graphics layer. The custom widget may provide details regarding its owner (e.g., graphics application), content or type of graphics commands associated with the custom widget, parameters to enable or disable interactivity (e.g., masking). It should be understood that the parameters shown in FIG. 9 are merely exemplary, and various possible combinations of parameters or alternative methods may be employed to implement the subject matter described herein.

In an exemplary embodiment, the display intermix server 208 is configured to determine the graphics application 202 that should respond to the HMI event (task 808). For example, the display intermix server 208 may have a plurality of graphics applications 202 associated with the display intermix server 208. The HMI event may occur at a location and/or coordinates that correspond to interactive objects in different graphics layers that are owned by different graphics applications 202 (e.g., interactive objects in different graphics layers that overlap). In this situation, the display intermix server 208 may receive a notification of a Hit from more than one graphics application 202. In an exemplary embodiment, the display intermix server 208 is configured to determine which graphics application 202 should respond to the HMI event based upon the priority scheme or rules of layering defined in the layering registry 226.

In accordance with one embodiment, the display intermix server 208 notifies the graphics application 202 to respond to the HMI event (task 810). If no interactive objects overlap among different graphics layers, the display intermix server 208 may notify the graphics application 202 producing the Hit to respond to the HMI event. In the situation where there is an overlap of interactive objects among graphics layers owned by different graphics applications 202, the display intermix server 208 may notify the graphics application 202 owning the graphics layer with highest priority (based on the priority scheme in the layering registry 226) among those producing a Hit to respond to the HMI event. The interactive intermix process 800 may be configured such that all other graphics applications 202 do not respond to the HMI event (e.g., by providing a separate notification not to respond). In accordance with another embodiment, if the HMI event produces a Hit in a graphics layer owned by the display intermix server 208, the display intermix server 208 may respond to the event if the graphics layer owned by the display intermix server 208 has the highest priority among those producing a Hit.

Referring to FIG. 7 and FIG. 8, the interactive intermix process 800 may be configured to be integrated with the display intermix process 700 as part of the interactive intermixing process (task 704), such that the loop defined by tasks 702, 704, 706, 708, 610, 712, 714, 716, and 718 is implemented using the graphics command generated based on the HMI event. In an exemplary embodiment, the graphics application 202 (or the display intermix server 208) that receives notification to respond to the HMI event proceeds to generate graphics commands (e.g., task 706) based on the HMI event.

In accordance with one embodiment, an exception to the interactive intermix process 800 occurs in the situation of an interactive pop-up message or menu owned by a graphics application 202 and/or the display intermix server 208. In an exemplary embodiment, it is desirable that pop-up messages or menus are displayed over other interactive objects and have priority over other objects, which could potentially conflict with the priority scheme or rules of layering. For example, an interactive pop-up object in a graphics layer owned by a graphics application 202 may overlap an interactive object in a graphics layer having higher priority and owned by another graphics application 202 (or the display intermix server 208). In an exemplary embodiment, the interactive intermix process 800 is configured such that the graphics application 202 (e.g., the interactive pop-up menu or message) is notified to respond to the HMI event while the display intermix server 208 (or other graphics applications) does not respond to the event, even though the graphics layer owned by the display intermix server 208 may have higher priority than the layer owned by the graphics application 202.

In another scenario, there may be an interactive pop-up object owned by a graphics application 202 that overlaps an interactive pop-up object owned by the display intermix server 208 (or another graphics application 202). In an exemplary embodiment, the interactive intermix process 800 is configured such that the interactive pop-up objects are combined or merged by generating a popup message listing overlapping interactive pop-up objects from graphics applications 202 well as the display intermix server 208. For example, a graphics application 202 may transmit the contents of the interactive pop-up object to the display intermix server 208 (e.g., via a message over a bus interconnection). The display intermix server 208 may then be configured to generate an integrated interactive pop-up object with contents from one or more graphics applications 202 and/or the display intermix server 208. In an exemplary embodiment, the integrated contents are ordered according to the priority scheme defined in the layering registry 226 for the respective layers. In an alternative embodiment, graphics applications 202 may respond to the HMI event and generate graphics commands corresponding to the interactive pop-up object and notify the display intermix server 208 of the location and the number of items in the interactive pop-up object. The display intermix server 208 may then construct an integrated interactive pop-up object by rendering additional interactive pop-up objects as a continuum of the interactive pop-up object generated by the graphics application 202 (e.g., append graphically).

CONCLUSION

One advantage of the system and/or method described above is that seamless intermixing of new graphics features with existing graphics application as well as with new graphics applications may be achieved with limited changes to existing or proven graphics applications. Upgrading or adding new features to existing graphics applications may be accomplished with minimal changes to already proven and certified graphics application software. Additionally, the systems and methods provide flexibility and control in defining the cockpit display.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method for intermixing a first graphics application having a first graphics layer and a second graphics application having a second graphics layer, the first graphics layer comprising a first logical grouping of graphical objects or widgets associated with the first graphics application and the second graphics layer comprising a second logical grouping of graphical objects or widgets associated with the second graphics application, the method comprising:
    streaming a first graphics command from the first graphics application to a first memory location in a command buffer, the first graphics command corresponding to the first graphics layer;
    streaming a second graphics command from the second graphics application to a second memory location in the command buffer, the second graphics command corresponding to the second graphics layer; and
    after streaming the first graphics command to the first memory location and the second graphics command to the second memory location:
        obtaining, by a display intermix server, the first graphics command from the first memory location;
        obtaining, by the display intermix server, the second graphics command from the second memory location;
        ordering, by the display intermix server, the first graphics command and the second graphics command based on a priority scheme for intermixing the first graphics application and the second graphics application after obtaining the first graphics command from the first memory location and the second graphics command from the second memory location, the ordering resulting in ordered graphics commands having an order of rendering in accordance with the priority scheme; and
        providing, by the display intermix server, the ordered graphics commands to a rendering interface, wherein each of the first graphics application, the second graphics application, and the display intermix server maintains its own space and time partitions in the same computing platform.

2. The method of claim 1, the first graphics application having a new graphics layer, wherein the method further comprises:
    updating the priority scheme to include the new graphics layer, resulting in an updated priority scheme;
    streaming a third graphics command from the first graphics application to a third memory location, the third graphics command corresponding to the new graphics layer; and
    after streaming the third graphics command:
        obtaining the third graphics command from the third memory location;
        ordering the third graphics command among the first graphics command and the second graphics command based on the updated priority scheme after obtaining the third graphics command from the third memory location, resulting in updated ordered graphics commands having an order of rendering for the first graphics layer, the second graphics layer and the new graphics layer in accordance with the updated priority scheme; and
        providing the updated ordered graphics commands to the rendering interface.

3. The method of claim 1, further comprising:
    updating the priority scheme into an updated priority scheme for intermixing a new graphics application with the first graphics application and the second graphics application that includes a third graphics layer, the third graphics layer corresponding to the new graphics application;

streaming a third graphics command from the new graphics application to a third memory location, the third graphics command corresponding to the third graphics layer; and after streaming the third graphics command:
obtaining the third graphics command from the third memory location;
ordering the third graphics command among the first graphics command and the second graphics command based on the updated priority scheme after obtaining the third graphics command from the third memory location, resulting in updated ordered graphics commands having an order of rendering for the first graphics layer, the second graphics layer and the third graphics layer in accordance with the updated priority scheme; and
providing the updated ordered graphics commands to the rendering interface.

4. The method of claim 1, the first graphics layer having a higher priority in the priority scheme than the second graphics layer, wherein the method further comprises:
receiving an event from an external interface; and
notifying the first graphics application to respond to the event when the event overlaps a first object in the first graphics layer and a second object in the second graphics layer based on the priority scheme.

5. The method of claim 1, the first graphics layer having a higher priority in the priority scheme than the second graphics layer, wherein the method further comprises:
receiving an event from an external interface; and
notifying the second graphics application to respond to the event when the event overlaps a first object in the first graphics layer and an interactive pop-up object in the second graphics layer.

6. The method of claim 1, further comprising:
receiving an event from an external interface; and
generating an integrated pop-up object combining a first interactive pop-up object in the first graphics layer and a second interactive pop-up object in the second graphics layer when the event overlaps the first interactive pop-up object and the second interactive pop-up object.

7. The method of claim 1, wherein:
streaming the first graphics command comprises:
generating the first graphics command based on a high-level graphics command from the first graphics application; and
storing the first graphics command at the first memory location, the first memory location corresponding to the first graphics layer; and
streaming the second graphics command comprises:
generating the second graphics command based on a second high-level graphics command from the second graphics application; and
storing the second graphics command at the second memory location, the second memory location corresponding to the second graphics layer.

8. A method for intermixing a plurality of graphics applications by a display intermix server, wherein the display intermix server and each graphics application of the plurality maintains its own space and time partitions in the same computing platform, the method comprising:
determining, by the display intermix server, a first graphics application of the plurality of graphics applications should respond to an event received from an external interface based at least in part on a priority scheme for rendering the plurality of graphics applications;
notifying, by the display intermix server, the first graphics application to respond to the event, the first graphics application generating a first graphics command based on the event, the first graphics command being stored in a first memory location in a command buffer including a plurality of graphics commands corresponding to the plurality of graphics applications;
receiving, by the display intermix server, the first memory location from the first graphics application;
obtaining, by the display intermix server, the first graphics command from the first memory location;
after obtaining the first graphics command from the first memory location in the command buffer, ordering, by the display intermix server, the first graphics command among the plurality of graphics commands corresponding to the plurality of graphics applications based on the priority scheme, resulting in a plurality of ordered graphics commands; and
providing, by the display intermix server, the plurality of ordered graphics commands to a rendering interface according to the priority scheme.

9. The method of claim 8, further comprising updating the priority scheme to an updated priority scheme that includes a new graphics application.

10. The method of claim 9, further comprising:
obtaining a second graphics command corresponding to the new graphics application; and
ordering the second graphics command among the plurality of graphics commands, wherein the second graphics command is ordered based on the updated priority scheme.

11. The method of claim 8, further comprising
determining a second graphics application of the plurality of graphics applications should respond to the event;
notifying the second graphics application to respond to the event, the second graphics application generating a second graphics command based on the event, the second graphics command being stored in a second memory location;
receiving the second memory location from the second graphics application;
obtaining the second graphics command from the second memory location; and
generating an interactive message comprising the first graphics command and the second graphics command, wherein the interactive message is assigned highest priority in the priority scheme.

12. The method of claim 11, further comprising ordering the first graphics command and the second graphics command within the interactive message based on the priority scheme.

13. The method of claim 8, wherein:
the event corresponds to an object in a second graphics layer associated with a second graphics application of the plurality of graphics applications;
the second graphics layer has a higher priority in the priority scheme than a first graphics layer associated with the first graphics application; and
determining the first graphics application of the plurality of graphics applications should respond to the event comprises determining the first graphics application should respond to the event when the event corresponds to an interactive pop-up message in the first graphics layer.

14. The method of claim 8, wherein:
the event corresponds to a first object in a first graphics layer associated with the first graphics application and a second object in a second graphics layer associated with a second graphics application of the plurality of graphics applications; and
determining the first graphics application of the plurality of graphics applications should respond to the event comprises determining the first graphics layer has a higher priority than the second graphics layer based on the priority scheme.

15. A display system comprising:
a command buffer;
a first graphics application maintaining its own space and time partition on a computing platform, the first graphics application having a first graphics layer associated therewith, wherein the first graphics application is configured to generate a first high-level graphics command corresponding to the first graphics layer;
a second graphics application maintaining its own space and time partition on the computing platform, the second graphics application having a second graphics layer associated therewith, wherein the second graphics application is configured to generate a second high-level graphics command corresponding to the second graphics layer;
a graphics programming interface, the graphics programming interface being configured to:
generate a first graphics command based on the first high-level graphics command;
store the first graphics command in a first memory location in the command buffer;
generate a second graphics command based on the second high-level graphics command; and
store the second graphics command in a second memory location in the command buffer; and
a display intermix server maintaining its own space and time partition on the computing platform, the display intermix server being configured to:
obtain the first graphics command from the first memory location in the command buffer;
obtain the second graphics command from the second memory location in the command buffer;
order the first graphics command and the second graphics command based on a priority scheme after obtaining the first graphics command and the second graphics command from the command buffer, wherein ordering the first graphics command and the second graphics command results in ordered graphics commands having an order of rendering in accordance with the priority scheme; and
provide the ordered graphics commands to a rendering interface.

16. The display system of claim 15, further comprising:
a first avionics module configured to generate a first control command and provide the first control command to the first graphics application, the first graphics application generating the first high-level graphics command in response to the first control command; and
a second avionics module configured to generate a second control command and provide the second control command to the second graphics application, the second graphics application generating the second high-level graphics command in response to the second control command.

17. The display system of claim 15, further comprising a human machine interface coupled to the display intermix server, the first graphics application, and the second graphics application, the human machine interface being configured to provide notification of an event to the display intermix server, the first graphics application, and the second graphics application, wherein:
when the event corresponds to an object in the second graphics layer and the second graphics layer has a higher priority in the priority scheme than the first graphics layer, the display intermix server is configured to notify the first graphics application it should respond to the event when the event corresponds to an interactive pop-up message in the first graphics layer.

18. The display system of claim 15, further comprising a human machine interface coupled to the display intermix server, the first graphics application, and the second graphics application, the human machine interface being configured to provide notification of an event to the display intermix server, the first graphics application, and the second graphics application, wherein:
when the event corresponds to a first object in the first graphics layer and a second object in the second graphics layer, the display intermix server is configured to notify the first graphics application it should respond to the event when the first graphics layer has a higher priority than the second graphics layer in the priority scheme.

19. The display system of claim 15, wherein:
the first graphics command comprises a first low-level graphics command;
the second graphics command comprises a second low-level graphics command; and
the graphics programming interface is configured to:
generate the first graphics command by converting the first high-level graphics command to the first low-level graphics command; and
generate the second graphics command by converting the second high-level graphics command to the second low-level graphics command.

20. The display system of claim 15, further comprising:
a routing registry coupled to the first graphics application and the second graphics application, the routing registry containing information for mapping graphics commands for the first graphics layer to the first memory location corresponding to the first graphics layer and mapping graphics commands for the second graphics layer to the second memory location corresponding to the second graphics layer; and
a layering registry coupled to the display intermix server, the layering registry defining the priority scheme.

* * * * *